March 16, 1954  E. LJUNGSTROM  2,671,948
METHOD OF MAKING FLINT RODS
Filed June 19, 1948  3 Sheets-Sheet 1

INVENTOR:
ERIK LJUNGSTROM
BY K. B. /....
ATTORNEY

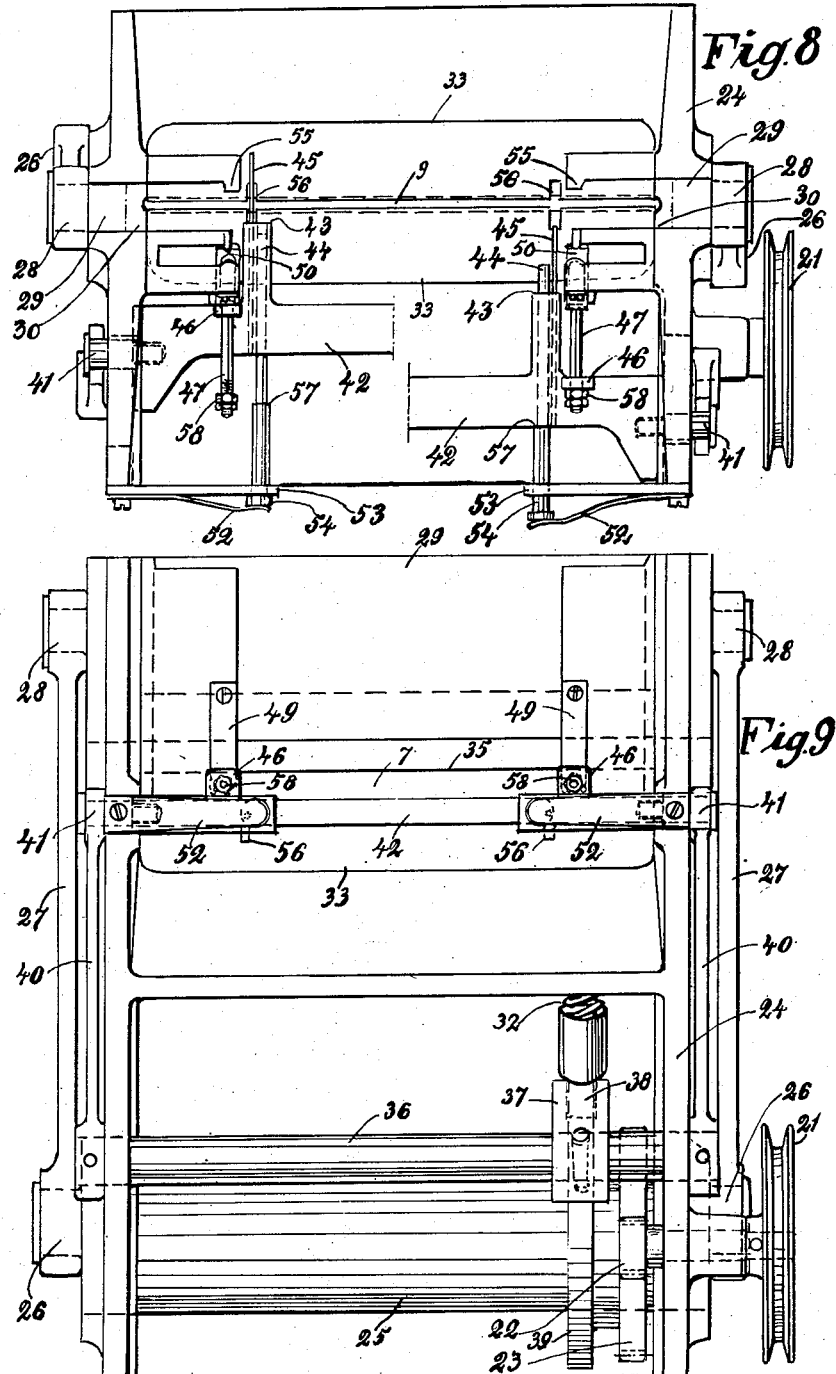

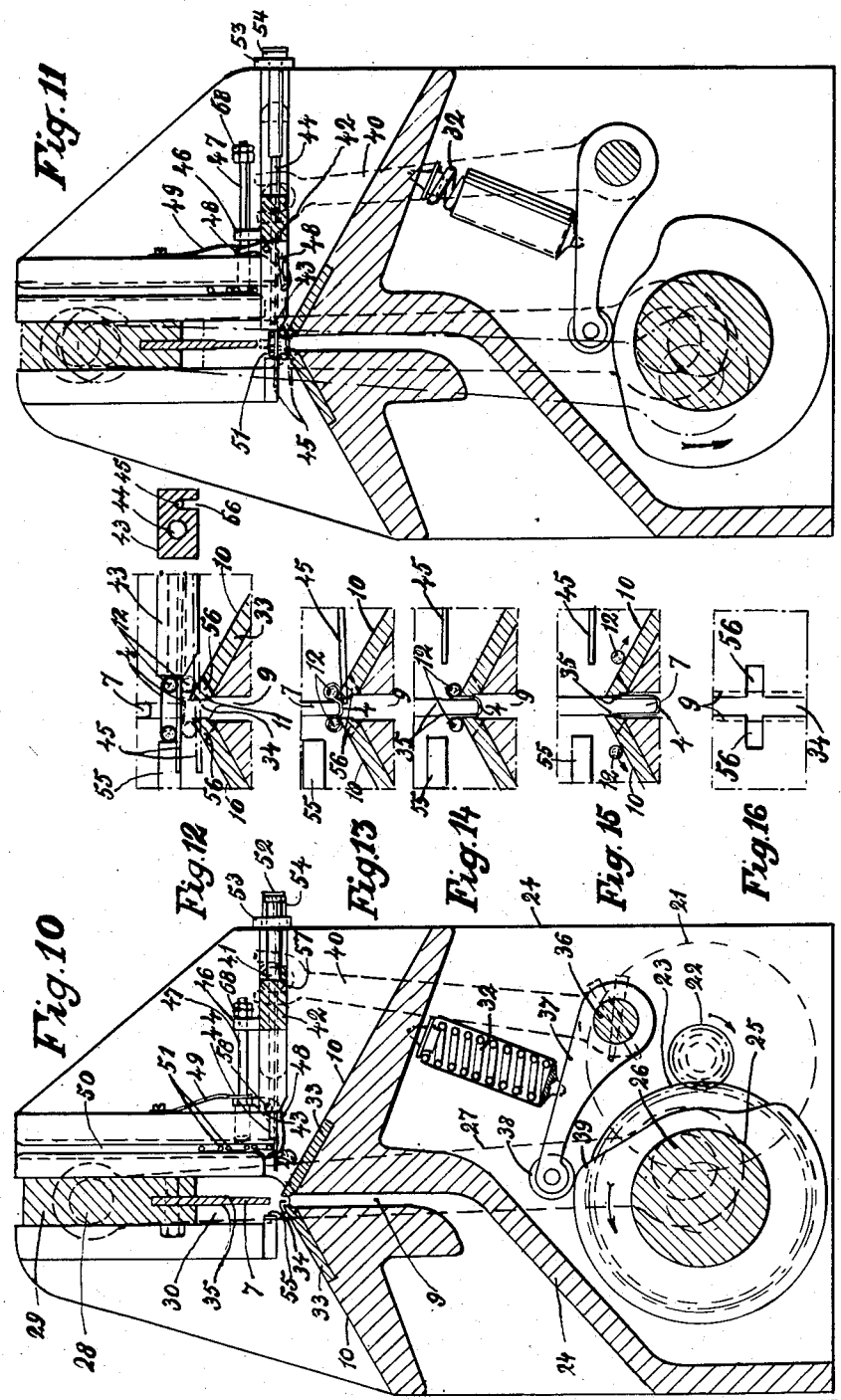

Patented Mar. 16, 1954

2,671,948

UNITED STATES PATENT OFFICE 2,671,948

METHOD OF MAKING FLINT RODS

Erik Ljungström, Lidingo, Sweden

Application June 19, 1948, Serial No. 34,078

Claims priority, application Sweden June 21, 1947

4 Claims. (Cl. 29—148)

The present invention relates to a method of making flints, and more particularly of flints made of cerium metal in the form of moulded bars.

The moulding into bar-form is usually performed in metal tubes which are made by bending a strip of sheet metal in such a way that the edges butt-joint each other. After the moulding the pipe must be removed from the moulded bar which is done by opening the pipe along the longitudinal joint. This opening operation has up to now been effected by hand which involves a number of difficulties partly because of the small dimensions of the pipe, partly because of a possible melting together to a certain extent of the plate material of the tube and the moulded flint material and partly because of the lack of a hold near the joint of the pipe on one or both of the edges to be separated along the said joint.

The principal object of the present invention is to provide a method for the manufacture of flints of the type described permitting such flints to be produced in a simple manner.

Another object of the invention is to provide a method for the manufacture of flints of the type described by moulding in tubes having a gripping portion facilitating opening of the tube after the moulding.

A further object of the invention is to provide a method for the manufacture of flints of the type described by moulding in tubes formed in pairs by bending two opposite ends of a sheet plate, the intermediate part between them constituting the gripping portion.

Other objects of the invention will be apparent from the following description, reference being made to the accompanying drawings showing by way of example the principle of the invention and a machine for performing the method according to the invention.

In the drawings:

Fig. 8 is a top view of a semi-automatic machine for the opening method according to the invention showing a feeding mechanism in its two extreme positions;

Fig. 9 is a view of the supply side of the machine, part of the cover being removed;

Figs. 10 and 11 are cross-sections through the middle part of the machine and show the feeding mechanism in its two extreme positions;

Figs. 12–15 are sectional views, on a larger scale, of a portion of the machine containing cooperating feeding and opening members in different positions relative to each other and a double tube unit in different phases of the unrolling operation;

Fig. 16 is a top view of the portion of the machine shown in Figs. 12 to 15.

Figure 1:
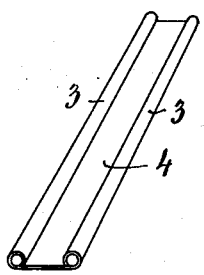
Fig. 1 is a perspective view of a pair of moulding tubes formed from a strip of sheet metal.
Figure 2:
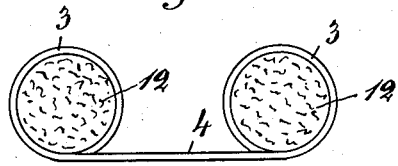
Fig. 2 is an end view, on a larger scale, of the double tube unit shown in Fig. 1.
Figure 3:
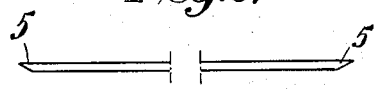
Fig. 3 is an end view, on a still larger scale, of the ends of the strip of plate before the double tube unit is formed.
Figure 6:
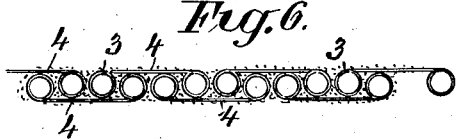
Fig. 6 is an end view of a plurality of double tube units interposed into each other before the moulding.

Figs. 1 and 2 show a strip of plate having longitudinal edges rolled in opposite directions to form two tubes 3, 3, an intermediate part 4 remaining plane in order to form a gripping portion for the subsequent unrolling of the pipes after they have been filled with flint material. The longitudinal edges may be beveled in the manner indicated by numeral 5 in Fig. 3 to obtain a smooth transition at the joint in the inside of the tube. One may, however, omit beveling particularly if the plate material is thin. The double tube units may suitably be adapted to be interposed in relation to each other in the manner illustrated in Fig. 6. For this purpose the intermediate member 4 is given such a breadth as to permit the placing of two tubes of adjacent units between the tubes of a first unit. In this way any desired number of equally dimensioned double tube units may be interposed so as to produce a low row of tubes. Such rows of interposed pipes may be used to form larger aggregates by placing a desired number of rows laterally adjacent to each other. All spaces between the outside of the tubes are filled for instance with graphite in order to prevent melted flint-material from penetrating into said spaces during the moulding operation.

The moulding itself may be performed in any known manner and does not constitute part of the present invention.

After the moulding, the aggregates are taken apart to separate the double tube units from which they had been composed. This separation is not difficult because the filling of all spaces between the outside of the tubes has prevented the double tube units from being fastened together by flint material during the moulding operation.

Figure 4:
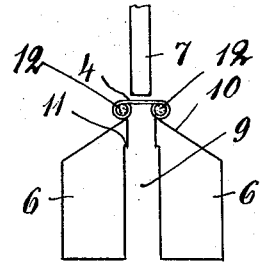
Figs. 4 and 5 are diagrammatic illustrations of the method according to the invention to open the double tube unit after the moulding of the flints.
Figure 5:
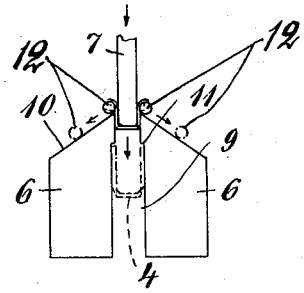

After the separation, each double tube unit contains moulded flint material within the tubes 3, as is apparent from Fig. 2 in which the said material is indicated by numeral 12. Figs. 4 and 5 illustrate diagrammatically how a double tube unit is opened by unrolling. For this purpose it is placed on a support composed of two bars 6 separated by a span 9. A punch 7 is arranged to move down into the space 9 and out of the same. A double tube unit containing flint material moulded into its tubes is placed over the space with the tubes 3 extending downwards. The punch, when moving downwards, hits the intermediate portion, pushing it downwards into the space 9, so that the pipes 3 are unrolled from the moulded material contained therein. Said material which has a cylindrical configuration rolls down along sloping outer surfaces 10 of the bars. The walls of the space have projections 11 which prevent the unrolled plate from being conducted back when the punch moves up the longitudinal edges of the plate, because of the resiliency of the plate material, moving under the projections.

Figure 7:
Fig. 7 is an end view of a plurality of tubes formed from a single strip of plate.

According to Fig. 7, a plurality of parallel tubes are formed by a plate member 8. After the moulding the tubes are opened by drawing the lateral ends of plate 8 outwards.

The machine for performing the method according to the invention is illustrated in Figs. 8–11 and is suited for the semi-automatic unrolling the double tube units after the moulding operation. It is driven by a motor not shown by a cone belt passing over a grooved pulley 21 which drives shaft 25 supported in frame 24 through spur gear wheels 22 and 23 at a lower speed than that of the pulley 21. The shaft 25 carries on both ends pins 26 which are positioned symmetrically but eccentrically and which pivotally support one end of connecting rods 27. The other end of the connecting rods 27 are pivoted on pins 28 extending from opposite ends of a punch holder 29 (the medium part of which, between the dot and dash lines( in Fig 8 is broken away in order to show elements located therebelow) moving in slots 30 extending vertically in the frame 24. The holder 29 carries a punch 7. Rotation of the shaft 25 will cause the punch 7 to reciprocate once at each revolution of the shaft.

The frame 24 has a slit 9 having an inlet extending horizontally and being adapted to receive the punch or plunger 7. The slit is open at the bottom (see Fig. 10). The upper opening 34 of said slit 9 is on both longitudinal edges provided with linings 33 forming part of sloping faces 10 arranged on the frame 24. Said linings 33, each of which has a recess 56 (see Figs. 12, 13 and 16 leave between them only so much space as to allow the punch 7 to pass with a minimum of clearance, in particular the upper portion thereof, which is slightly broader than its lower portion, forming a shoulder 35.

A cam 39 is rigidly secured to shaft 25. A roll 38 revolvable in one end of an arm 37 the other end of which is rigidly secured to a shaft 36 revolvable in the frame 24, is pressed against said cam by a spring 32. To each end of said shaft 36 an arm 40 is secured in a predetermined angular position relatively to the arm 37. The outer end of each arm 40 is slidingly connected with pins 41 each pin being inserted in a horizontal slot in gable-like portions of the frame 24. The pins 41 are on their inner side rigidly connected to guide blocks 42. Said blocks 42 have two horizontally extending sleeve portions 43 having each a horizontal bore for a turning tap 44 displaceable therein under the action of a spring 52 within the limits constituted by a head 54 and a stopper 53. Each sleeve portion has on its underside a groove 66 parallel to the aforementioned bore (see Fig. 12) and accommodating a resilient steel wire 45 whose rear end is rigidly secured to the block 42 and whose unsupported front end is free to move downwards. Each block 42 has an ear 46 on its top-side, which ears have a hole for the passage of a bolt 47. One end of each bolt carries a nut 58, the other end extending through a hole in a vertically projecting lip of pawls 48 pivoted on pins 58. Said lip is kept in its vertically projecting position by a plate spring 49 fixed to the frame 24. The bolts 47 have end portions of enlarged diameter which extend through holes which open into a vertical slot 50 constituting a magazine for the double tube units containing moulded material and stored in said magazine in the manner indicated in Fig. 10.

Fig. 10 illustrates the starting position for the machine according to the invention. When the shaft 25 begins to rotate, the punch 7 moves upwards and the arms 37 turns counter-clockwise which causes the guide blocks 42 to move in the direction towards the punch. The lowermost double tube unit in the magazine which rests on the support wires 45 is hit at its lower end portion by the turning taps 44 situated somewhat above the support wires and brought forward by the springs 52. This movement, which takes place simultaneously with the turning of the pawls 48 which are turned by the springs 49 about the pivots 58 whereby the passage for the lowermost double-pipe unit is made clear, causes said unit to turn into a horizontal position. Before that this turning movement is finished the movement ahead of the ears 46 which form part of the guide blocks 42 has allowed the holding bolts 47 to be displaced in the same direction by the springs 49 acting on the larger foremost portion of the bolts 47 via the vertically projecting lips of the pawls 48, thus bearing the passage for the next following double tube unit in the magazine slot 50 where it is not permitted to move down farther than to the position indicated in Fig. 11. During the continuing movement of the guide blocks 42 the displacement of the turning taps 44 is stopped by the head 54 abutting against the stopper 53. The forward ends of the sleeve portions 43 now abut against the first-mentioned double tube unit and continue to guide said unit which finally rests only on the support wires in horizontal position and at that place in the machine where the unrolling of the pipes will be performed. In order to prevent throwing the unit too far and past the slit 9, three stopper projections 55 may be arranged on the other side of the slit 9 in a suitable elevation above the slit opening 34 which elevation must be so great as not to prevent rolling down of the moulded material along the sloping face 10 situated below said stopper projections.

During the movements described of the feeding mechanism the punch 7 has reached its highest position and begins to move downwards. Because of the characteristic of the curve of cam 39 the feeding mechanism rests when the lower edge of the punch hits the intermediate portion 4 of the double tube unit and presses the same which still rests on the support wires 45 downwards towards the slit opening 34 where the recesses 56 in the linings 33 accommodate the free ends of the wires 45 which have yielded downwards together with the double tube unit resting on them. Immediately after that the double tube unit has come into contact with the linings 33, the cam 39 rotated by the shaft 25 having reached a position in which the roll 38 and the lever arm 37 are quickly displaced upwardly thus causing the feeding mechanism quickly to return to its starting position. During this return movement the shoulders 46 on the guide blocks 42 finally abut against the nuts 68 at the rear ends of the holding bolts 47, turning the pawls 48 so as to bar the next following double tube unit and prevent the same, which, because of the simultaneous returning of the holding bolts 47, falls down upon the support wires 45, from further proceeding and preventing subsequent units from falling down at the same time.

Under this last phase of movement of the feeding mechanism which now for a short time comes to a rest, the punch 7 continues its movement downwards and pushes the intermediate portion 4 of the double tube unit into the slit 9. The unrolling operation which now is performed, will be apparent from the Figs. 12-15.

The lateral margins of the sheet which form the tube 3 are forced to follow the intermediate portion 4 because they form part of the same strip of sheet metal. They are thus peeled off the moulded material 12 contained in the tubes. Said material is thus set free on both sides of the slit 9 and because of its substantially circular cross-section rolls down along the sloping surfaces 10 to receivers not shown. The plate strip is moved by the lower end of punch 7 downwards into the slit 9 until its somewhat resilient ends abut against the sides of the lower portion of the punch 7 (see Fig. 15). Said ends will then be just below the shoulders 35 of said punch.

The punch 7 continues its movement downwards until the shoulders 35 have entered the slit which as above stated only leaves a minimum of clearance to the broader part of the punch above the said shoulders. Thereupon the latter cooperate with the linings 33 as cutting dies which cut off plate residues which have not entered the slit. Such residues may remain outside the slit 9 because the plate material under the moulding operation may be burnt and become fragile. Such material will be torn off during the unrolling operation particularly on such points where pipe material and moulded material have alloyed together. The residues cut off will then slide down along the sloping surfaces 10.

The further rotation of the shaft 25 causes the punch 7 to move upwards and the cycle of operation will begin anew in the manner described above. The sheet plate pushed down by the punch 7 into the slit 9 will, however, be prevented from following the punch on its upward movement, because its somewhat resilient ends will be caught by the shoulders 34 of the linings 33.

While some more or less specific embodiments of the invention have been shown in the drawing, it is to be understood that this is for purpose of illustration only, and the invention is not to be liimted thereby, but its scope is to be determined by the appended claims viewed in the light of the prior art.

What I claim is:

1. The method of making flint rods comprising the steps of rolling the long edge portions of a rectangular sheet member in opposite directions and toward each other to form two parallel tubes individually having a circular internal cross-section and being spaced from each other by the longitudinal center portion of the sheet member, moulding in the so formed tubes a material substantially consisting of cerium, applying pressure to the center portion of the sheet member and simultaneously supporting the tubes to counteract said pressure and unrolling the tubes in opposite directions for releasing the moulded material.

2. The method of making flint rods comprising the steps of rolling the long edge portions of a rectangular sheet member in opposite directions and toward each other to form two parallel tubes individually having a circular internal cross-section and being spaced from each other by the longitudinal center portion of the sheet member, moulding in the so formed tubes a material substantially consisting of cerium, applying pressure to the center portion of the sheet member and simultaneously applying pressure to the tubes in the opposite direction to the pressure which is applied to the center portion of the sheet member and unrolling the tubes in opposite directions and peeling same from the flint rods moulded therein.

3. A method of making flint rods comprising making a mould by rolling the long edges of a rectangular, flat sheet member in opposite directions toward each other to form two parallel tubes individually having a cylindrical interior and being spaced by the remaining flat longitudinal center portion of the sheet member extending tangentially from the tubes which extend both from the same surface of the sheet member, filling the so formed tubes with a material consisting substantially of cerium in liquid state, allowing the material to harden to form flint rods of circular cross-section in the tubes, placing the mould on a support with the tubes extending downward from the flat center portion of the sheet member and resting individually on individual support bars which are parallel to the tubes and spaced from each other slightly less than the longitudinal centers of the tubes and which support bars individually have a top surface declining outwardly from the longitudinal center of the support, applying a downward pressure to the center portion of the sheet member to force it into the space between the two bars and unrolling the two tubes in opposite directions and peeling them from the flint rods, and rolling the latter down on the declining top surfaces of the support bars.

4. A method of making flint rods as defined in claim 1, comprising beveling the long edges of the rectangular flat sheet member in opposite directions prior to rolling the edges.

ERIK LJUNGSTRÖM.

References Cited in the file of this patent

UNITED STATES PATENTS

| Number | Name | Date |
|---|---|---|
| 922,990 | White | May 25, 1909 |
| 1,537,405 | Bundy | May 12, 1925 |
| 1,737,262 | Morin | Nov. 26, 1929 |
| 1,712,961 | Lee et al. | May 14, 1929 |
| 1,979,963 | Decker | Nov. 6, 1934 |
| 1,989,186 | De Bats | Jan. 29, 1935 |
| 1,997,871 | Miller et al. | Apr. 16, 1935 |
| 2,008,854 | Dostal | July 23, 1935 |
| 2,054,703 | Little | Sept. 15, 1936 |
| 2,062,486 | Van Dusen, Jr., et al. | Dec. 1, 1936 |
| 2,177,048 | Wirtz | Oct. 24, 1939 |
| 2,301,819 | Sambrook | Nov. 10, 1942 |
| 2,396,636 | Broadhurst | Mar. 19, 1946 |
| 2,435,505 | Morin | Feb. 3, 1948 |
| 2,481,025 | Koch | Sept. 6, 1949 |

FOREIGN PATENTS

| Number | Country | Date |
|---|---|---|
| 485,710 | France | Feb. 1, 1918 |
| 320,091 | Germany | Apr. 10, 1920 |